Nov. 5, 1968    M. JUNG ET AL    3,409,474
HYDROGEN STORING ELECTRODE AND PROCESS FOR ITS MANUFACTURE
Filed July 26, 1961
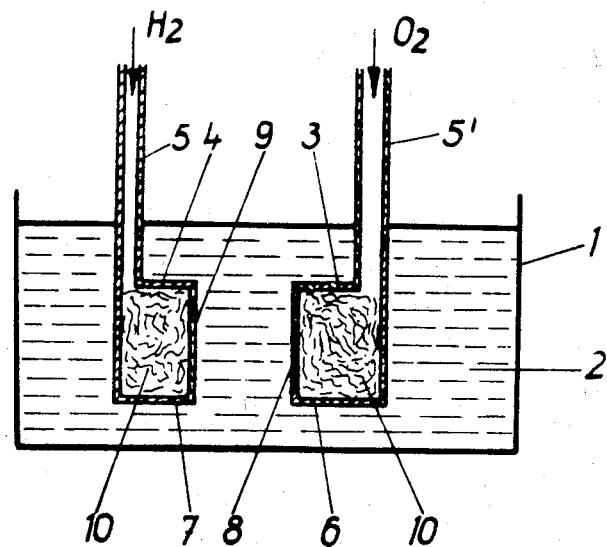
INVENTORS
MARGARETE JUNG and
BY   HANNS H. KROEGER
AGENT

United States Patent Office 3,409,474
Patented Nov. 5, 1968

3,409,474
HYDROGEN STORING ELECTRODE AND PROCESS FOR ITS MANUFACTURE
Margarete Jung, Nieder-Eschbach, Taunus, and Hanns H. Kroeger, Frankfurt am Main, Germany, assignors to Varta Aktiengesellschaft, Hagen, Westphalia, Germany, a corporation of Germany
Filed July 26, 1961, Ser. No. 127,031
Claims priority, application Germany, July 28, 1960, A 35,218
12 Claims. (Cl. 136—120)

The present invention relates to electrodes capable of storing hydrogen and useful in such electrochemical devices as storage battery cells with alkaline electrolytes and and in fuel cells, as well as to a process for making such electrodes.

It is known to produce such electrodes by sintering or pressing metallic powders into a porous body, impregnating the porous body with a solution of an electrochemically active substance, and precipitating this substance in the porous body. In such electrodes, the major portion must consist of an electrochemically inactive but electrically conductive support grid because otherwise the conductivity and the corresponding capacity of the electrode would vary constantly as the charge and discharge of the storage battery change the chemical composition of the active mass. Therefore, such electrodes have a relatively large mass of electrochemically ineffective components so that their capacity is small in relation to their volume.

It is accordingly the primary object of this invention to provide a light electrode of high capacity which is particularly useful in galvanic elements with alkaline electrolyte.

This and other objects and advantages are obtained in accordance with the invention by providing a porous body of a thermoplastic synthetic resin and a Raney metal as the electrode. The major portion of the porous body, which has the resin and the metal distributed therethrough, consists of the Raney metal. The preferred ratio of resin to metal is about 1 to at least 50.

Useful thermoplastic resins include high molecular weight and low molecular weight polyethylene, polypropylene, polymethacrylate, polyvinylchloride, and polytetrafluoro ethylene. The resin may have some electrical conductivity e.g. by addition of graphite powder.

According to the invention, electrodes may be produced by intimately mixing a particulate thermoplastic synthetic resin and a particulate Raney metal alloy, preferably of a particle size of $4\mu$ to $4000\mu$, the most useful range being $10\mu$ to $100\mu$, pressing the mixture at an elevated temperature to form the porous electrode body, and removing the catalytically inactive component from the Raney metal alloy, the catalytically active component remaining to store hydrogen in the electrode.

The temperature and pressure used to form the porous electrode body are below the melting point but above the softening point of the resin.

The catalytically inactive component of the Raney metal alloy is removed in the conventional manner by a treatment with a highly concentrated alkali metal hydroxide solution, for instance, with a 6 N sodium hydroxide solution which produces a lively evolvement of hydrogen. Simultaneously, considerable amounts of hydrogen are adsorbed and incorporated into the matrix of the catalytically active component of the metal. For instance, in the case of Raney nickel, about 1.2 hydrogen atoms are incorporated into the catalyst for every atom of nickel.

If such a porous body is used, for instance, as the negative electrode in an alkaline galvanic element, this stored hydrogen may be electrochemically utilized. The hydrogen removed during discharge may be brought back again into the electrode by the hydrogen evolution at the cathode. Since the removal of the hydrogen from the electrode also involves the electrolyte solution, it is advantageous in this case to use a suitable resin for the electrode mixture, such as polymethacrylate and high molecular weight polyethylene.

In fuel cells in which the fuel is either hydrogen or a fluid, i.e. gaseous or liquid fuel such as ethylene glycol which is decomposed while evolving hydrogen, the porous body of this invention may be used as the fuel electrode. The removal of the hydrogen from such fuel electrodes is effected essentially in the gaseous phase so that wetting of the inner pores of the electrodes is not desired. Useful resins for this purpose include low molecular weight polyethylene, polyvinylchloride and polytetrafluoro ethylene.

The porous body of this invention may also be useful as a hydrogen absorbing electrode in a hermetically sealed alkaline storage battery cell. Since such an electrode is capable of storing a considerable amount of hydrogen in its catalytic matrix, an undue pressure rise due to the presence of hydrogen in the sealed cell will be avoided.

The advantages of such electrodes over conventional structures are manifold and include:

(1) Their capacity per volume or weight of electrode is considerably increased.

(2) The porous body is flexible and may, therefore, be shaped to any desired form.

(3) Before activation, i.e. before the catalytically inactive component is removed, the porous body may be stored indefinitely without the known deterioration due to aging of conventional electrodes.

(4) Considerable production economies are possible because the manufacturing temperatures are much lower, no expensive material for the electrochemically inactive grid is needed, and the complicated impregnation of the grid with the active material is eliminated.

The invention will be illustrated in the following specific examples:

*Example 1*

36 g. of finely divided Raney nickel alloy (50% Ni and 50% Al, both by weight) and 1 g. of polyethylene powder, both of a particle size of less than $20\mu$ were intimately mixed. The mixture was placed into a mold which was heated to 160° C. and a porous body of 50 mm. diameter was produced by pressing under a pressure of 500 kg./sq. cm.

The pressed body was cooled under pressure and was readily removed from the mold after cooling. The resultant porous body was made useful as an electrode by removing the inactive aluminum component in the conventional manner by treatment with 6 N sodium hydroxide solution.

When placed as negative electrode in an otherwise conventional alkaline storage battery cell, the pressed body could be charged several times for 10 hours with a current of 500 ma., being regenerated after each charging cycle by cathodic hydrogen evolution.

*Example 2*

An intimate mixture of 73.6 g. Raney metal alloy of a particle size from $150\mu$ to $200\mu$ (81.5% Zn, 6.8% Ni, 6.8% Co and 4.9% Ag, all by weight) and 1.2 g. of polyethylene powder of a particle size of about $15\mu$ was produced. Half of the mixture was placed into a mold and pressed at ambient temperature until it was somewhat densified. A nickel wire mesh was placed over the densified layer of the mixutre to serve as current conductor for the electrode and the other half of the mixture was then placed in the mold over the wire mesh. The entire assembly was now pressed under the same conditions as in Example 1 and, after removal of the inactive component of the Raney metal alloy, the porous body was used in the same manner as in Example 1.

Example 3

31 g. of Raney metal alloy of a particle size of 15μ (64.5% Al, 6.5% Pd, and 29.0% Ti, all by weight) was intimately mixed with 1 g. of polyethylene of a particle size of about 5μ and 0.5 g. of graphite of a particle size of 3μ. This mixture was pressed and the pressed porous body was activated as in Example 1.

The resultant electrode was able to take a charge of 550 ma. for 10 hours. After regeneration, it was again capable of sustaining a like load.

Example 4

Proceeding as in Example 2, a current conductor was inserted between two like layers of a mixture of 36 g. of Raney nickel alloy (50% Ni and 50% Al, both by weight), 1.2 g. polyethylene, and 0.5 g. of graphite powder. The current conductor consisted of a perforated sheet of pure nickel.

Example 5

An intimate mixture was produced of 36 g. of Raney nickel alloy (50% Ni and 50% Al, both by weight), 1 g. of polyethylene, 0.5 g. of graphite, and 0.5 g. of sodium chloride, all materials having a particle size of less than 20μ. This mixture was pressed to form a porous body of 50 mm. diameter as in Example 1. After removal of the cooled body from the mold, the readily soluble sodium chloride was quantitatively removed by treatment with distilled water, thus increasing the pore volume of the body until the water was free of chlorine ions. Subsequently, the inactive aluminum was removed in a conventional manner by treatment with concentrated sodium hydroxide solution.

Used as a negative electrode in an alkaline storage battery cell, this electrode sustained a load of 600 ma. for 8 hours and showed the same capacity after regeneration.

Example 6

30 g. of finely divided Raney cobalt alloy (50% Co and 50% Al, both by weight) of a particle size between 20μ and 50μ and 1 g. of polypropylene powder of a particle size of about 10μ were intimately mixed. The mixture was placed into a mold which was heated to 210° C. and a porous body of 50 mm. diameter was produced by pressing under a pressure of 500 kg./sq. cm.

The pressed body was cooled under pressure and was readily removed from the mold after cooling. The resultant porous body was made useful as an electrode by removing the inactive aluminum component in the conventional manner by treatment with 6 N sodium hydroxide solution.

Example 7

30 g. of granular Raney nickel alloy (50% Ni and 50% Al, both by weight) of a particle size of 1 mm. to 2 mm. and 1.3 g. of polymethacrylate of a particle size of about 60μ were intimately mixed with 5 g. of sodium chloride of a particle size of about 100μ. The mixture was placed into a mold which was heated to 125° C. and a porous body of 50 mm. diameter was produced by pressing under a pressure of 450 kg./sq. cm. After removal of the cooled body from the mold, the readily soluble sodium chloride was quantitatively removed by treatment with distilled water, thus increasing the pore volume of the body until the water was free of chlorine ions. Subsequently, the inactive aluminum was removed in a conventional manner by treatment with concentrated sodium hydroxide solution.

The porous molded body was used as electrode in a fuel cell. Such a fuel cell and electrode is illustrated in the accompanying drawing wherein The drawing is a schematic sectional side view of a conventional fuel cell incorporating the invention.

Referring now to the drawing, there is shown a fuel cell container 1 of any suitable alkali-resistant material. The container material may be a synthetic resin, such as polyethylene or polystyrene. The container holds the electrolyte 2 which consists of 6 N potassium hydroxide solution. The fuel electrode 4 and the oxygen electrode 3 are immersed in the electrolyte, conduits 5 and 5' being connected to the respective electrodes to convey hydrogen gas to the negative electrode 4 and oxygen gas to the positive electrode 3. The conduits, which preferably consist of nickel, have widened end portions 6 and 7 which hold the electrodes proper and simultaneously serve as current conductors from the electrodes 6 and 7. Said widened end portions are closed by the molded porous bodies 8 and 9 according to the present invention. The widened portions between the conduits 5 and 5' and the membranes 8 and 9 are filled with silver wool 10.

Such a fuel cell may be operated at room temperatures and under a pressure of 0.1–0.3 atm. gauge with 50 ma./sq. cm., and delivers a voltage of 0.8 v.

The same voltage is delivered if the cell is operated under the same pressure conditions but at 40° C. and with a charge of 100 ma./sq. cm.

Example 8

30 g. of finely divided Raney nickel alloy (50% Ni and 50% Al, both by weight) and 1.2 g. of polytetrafluoro ethylene powder, both of a particle size of about 20μ were intimately mixed. The mixture was placed into a mold which was heated to 300° C. and a porous body of 50 mm. diameter was produced by pressing under a pressure of 400 kg./sq. cm.

The pressed body was cooled under pressure and was readily removed from the mold after cooling. The resultant porous body was made useful as an electrode by removing the inactive aluminum component in the conventional manner by treatment with a 6 N sodium hydroxide solution.

Example 9

36 g. of finely divided Raney nickel alloy (50% Ni and 50% Al, both by weight) of a particle size of about 60μ and 2 g. of polyvinylchloride of a particle size of about 20μ and 4 g. of ammonium carbonate of a particle size of 10μ were intimately mixed. The mixture was placed into a mold which was heated to 130° C. and a porous body of 50 mm. diameter was produced by pressing under a pressure of 500 kg./sq. cm.

The pressed body was cooled without applying pressure and was readily removed from the mold after cooling. The resultant porous body was made useful as an electrode by removing the inactive aluminum component in the conventional manner by treatment with a 5.5 N sodium hydroxide solution.

Other thermoplastic materials and Raney metal alloys than those mentioned hereinabove may, of course, also be used. The pressure and the temperature during compression of the electrodes may vary depending upon the type of thermoplastic material used.

While the invention has been described in connection with certain specific examples, it will be clearly understood that many variations and modifications may occur to the skilled in the art without departing from the spirit and scope of this invention as defined in the appended claims.

We claim:

1. A hydrogen storage electrode structure comprising a body of Raney metal particles and thermoplastic synthetic resin, both said metal and said resin being distributed throughout said body, said body being porous to both liquids and gases, and the ratio of said resin to said metal being between about 1:9 and about 1:50 by weight.

2. The electrode structure of claim 1 further comprising a current-conducting member embedded in said body.

3. The electrode structure of claim 1 further characterized in that said body comprises graphite particles also distributed throughout said body.

4. A negative electrode for a storage battery cell with alkaline electrolyte, comprising a body porous to both liquids and gases, said body being formed of Raney metal particles and thermoplastic synthetic resin, both said metal and said resin being distributed throughout said body, and the ratio of said resin to said metal being between about 1:9 and about 1:50 by weight.

5. A hydrogen electrode for a fuel cell comprising a body porous to both liquids and gases, said body including Raney metal particles and thermoplastic synthetic resin, both said metal and said resin being distributed throughout said body, and the ratio of said resin to said metal being between about 1:9 and about 1:50 by weight.

6. In a process for making a porous electrode, the steps which comprise intimately mixing a particulate thermoplastic synthetic resin and a particulate Raney metal alloy, the alloy including a catalytically active and a catalytically inactive component, and the ratio of said resin to said active component being between about 1:9 and about 1:50 by weight, pressing the mixture at an elevated temperature to form a porous body, and removing the catalytically inactive component from the Raney metal alloy.

7. The process of claim 6, wherein the particle size of the resin and Raney metal alloy is in the range of $4\mu$ to $4000\mu$.

8. The process of claim 6, wherein the particle size range of the resin and the Raney metal alloy is between about $10\mu$ and $100\mu$.

9. The process of claim 6, wherein the temperature and pressure used to form the porous body are below the melting point but above the softening point of the resin.

10. The process of claim 6, wherein the mixture is pressed about a current conducting member.

11. The process of claim 6, wherein a readily soluble substance is added to the mixture before pressing and said substance is dissolved out of the pressed body.

12. The process of claim 6, wherein a readily volatile substance is added to the mixture before pressing and said substance is evaporated out of the pressed body.

References Cited

UNITED STATES PATENTS

| | | |
|---|---|---|
| 1,988,861 | 11/1935 | Thorausch et al. 136—28 |
| 2,566,105 | 8/1951 | Zert 18—54.7 |
| 2,641,623 | 6/1953 | Winckler et al. 136—122 |
| 2,642,628 | 6/1953 | Zimmerman 18—54.7 |
| 2,708,683 | 5/1955 | Eisen 136—120.1 |
| 2,738,375 | 3/1956 | Schlotter 136—34 |
| 2,824,165 | 2/1958 | Marsal 136—122 |
| 2,865,865 | 12/1958 | Ockrent et al. 252—430 |
| 2,928,891 | 3/1960 | Justi et al. 136—120 |
| 2,977,401 | 3/1961 | Marsal et al. 136—120 |
| 3,051,662 | 8/1962 | Pitzer et al. 252—430 |
| 3,075,033 | 1/1963 | Salkind 136—120 |
| 3,097,974 | 7/1963 | McEvoy et al. 136—120 |
| 3,134,697 | 5/1964 | Niedrach 136—86 |

FOREIGN PATENTS

| | | |
|---|---|---|
| 215,847 | 7/1958 | Australia. |

JOHN H. MACK, *Primary Examiner.*

W. VAN SISE, *Assistant Examiner.*